FIG.6 Pooled antibody response of cattle inoculated with polyvalent vaccine composed of Pl-3, IBR, and BVD, expressed as neutralization indices at 1:100 antiserum dilution against IBR-SIU virus.

FIG. 7 Pooled antibody response of cattle inoculated with polyvalent vaccine composed of PI-3, IBR, and BVD, expressed as neutralization indices at 1:100 antiserum dilution against BVD-SIU virus.

FIG. 8

United States Patent Office 3,629,413
Patented Dec. 21, 1971

1

3,629,413
POLYVALENT BOVINE VACCINES AND METHODS OF MAKING AND USING SAME
Isaac L. Shechmeister, Joseph R. Kolar, Jr., and William G. Kamlade, Jr., Carbondale, Ill., assignors to Southern Illinois University Foundation, Carbondale, Ill.
Filed Feb. 4, 1970, Ser. No. 8,631
Int. Cl. C12k 5/00
U.S. Cl. 424—89                                  18 Claims

ABSTRACT OF THE DISCLOSURE

A polyvalent vaccine effective in immunization of bovines against infectious bovine rhinotracheitis virus (IBR), bovine viral diarrhea virus (BVD) and parainfluenza-3 virus (PI-3) is composed of a suspension, in a vehicle such as an aqueous solution of formaldehyde suitable for parenteral injection of the three viruses in killed form. The three viruses are separately propagated and separately suspended in aqueous solutions containing 0.4% by volume formalin, and the respective suspensions are maintained at a temperature of about 4° C. for one week. Portions, for example equal portions, of the three suspensions are combined to produce a polyvalent vaccine. An equal volume of an aqueous solution containing from one to five percent weight/volume of a soluble alginate, such as sodium alginate, having certain specified properties may be added to the vaccine as an adjuvant to enhance its effectiveness. Such polyvalent vaccines are adapted for parenteral administration in the vaccination of bovines.

BACKGROUND OF THE INVENTION

The present invention relates to vaccines and more particularly to a polyvalent vaccine useful in the treatment of infectious diseases in bovines.

Three viruses which commonly infect bovines such as beef cattle are infectious bovine rhinotracheitis (IBR), bovine viral diarrhea (BVD) and parainfluenza-3 (PI-3) also known as the "shipping fever" virus. Because they affect beef cattle, these viruses have given rise to a commercially significant problem. In the past, there have been available monovalent vaccines for the treatment of these respective viruses and a bivalent vaccine for the treatment of two of these three viruses. However, these vaccines have been prepared from live viruses. The use of such vaccines containing live viruses has been contraindicated in the case of pregnant cows, and the effect of such vaccines on other animals has not been fully evaluated. Also, there has not been available for treatment of the aforementioned viruses a vaccine containing an adjuvant to enhance its effectiveness.

In summary, there has not heretofore been available a single polyvalent vaccine which is effective against the three aforementioned viruses, which can be recommended and used in the treatment of all bovines and which requires only a single administration for effective protection of such bovine animals instead of multiple administrations of several different vaccines.

SUMMARY OF THE INVENTION

Among the objects of the invention may be noted the provision of a novel polyvalent vaccine which is effective in immunizing bovines against the three aforementioned viruses; the provision of such a vaccine which can safely and reliably be used in the vaccination of all bovines; the provision of a polyvalent vaccine of this type which contained the respective viruses in killed form; the provision of a vaccine of this character which produces an immune response in bovines which lasts for an extended period of time; and the provision of methods for preparing and using such polyvalent vaccines in a convenient and economical manner. Other objects and features will be in part apparent and in part pointed out hereinafter.

In accordance with the present invention, there is provided a polyvalent vaccine comprising a suspension, in a vehicle suitable for parenteral injection, of killed infectious bovine rhinotracheitis virus, bovine viral diarrhea virus and parainfluenza-3 virus. The invention is also directed to the method of preparing such a polyvalent vaccine by first separately propagating the three viruses, suspending the respective viruses in separate aqueous solutions containing a final concentration of about 0.4% by volume formalin to kill the viruses, maintaining each suspension at a temperature of about 4° C. for about one week, and combining portions of each suspension to produce a polyvalent vaccine containing the three viruses in killed form. The invention further includes the method of treating bovine infections by parenterally administering the novel polyvalent vaccines to bovines.

DESCRIPTION OF THE PREFERRED EMBODIMENTS

It has now been found, in accordance with the present invention, that a polyvalent vaccine containing antigens of infectious bovine rhinotracheitis virus, bovine viral diarrhea virus and parainfluenza-3 virus, all in killed form, is effective in the immunization of bovines against these viruses. Animal studies, described in detail hereinafter, have demonstrated the effectiveness of such a polyvalent vaccine against the infectious diseases caused by the viruses whose antigens are present in one vaccine.

The polyvalent vaccines of the invention are readily prepared by first separately propagating the three aforementioned viruses as described below. The three viruses are then separately suspended in an aqueous inactivating medium to kill the viruses. Preferably, the inactivating medium is an aqueous solution containing a final concentration of about 0.4% by volume Formalin. This final concentration may range between about 0.3% and 0.5% by volume Formalin. Formalin is a 37% by weight formaldehyde solution. The separate suspensions are maintained at a temperature of about 4° C. for approximately one week. Portions of the three suspensions are then combined to produce the complete polyvalent vaccine. Preferably, equal proportions of the three separate suspensions are combined to yield an effective vaccine. However, these proportions may be varied somewhat without substantially affecting the results obtained.

Preferably, the final vaccine contains a concentration of between about $10^5$ and about $10^8$ organisms or units of each of the three killed viruses per ml. of vaccine ($10^5$–$10^8$ TCID$_{50}$/ml.). The dosages of vaccine employed in carrying out the invention may be varied widely, but preferably ranges between 1 and 10 ml., a dosage of 1 ml. being preferred when the concentration of each of the killed viruses is about $10^8$ and a dosage of 10 ml. being preferred when the concentration of each of the killed viruses is about $10^5$. It will be understood that the concentrations and dosages employed may both be varied within the above-noted ranges.

In order to enhance the effectiveness of such a polyvalent vaccine, a soluble alginate may be incorporated into the vaccine as an adjuvant. Such soluble alginates and their properties are fully disclosed in Scherr et al. U.S. Pat. No. 3,075,883, dated Jan. 29, 1963, incorporated herein by reference. As disclosed therein, such soluble alginate may be utilized in the form of an aqueous solution containing from one to five percent weight-volume of a soluble alginate, such as sodium alginate, having the following characteristics:

(a) in 5% weight/volume aqueous solution, readily passes a 24-gauge needle;
(b) in 4% weight/volume aqueous solution, has a viscosity less than 50 centistokes;
(c) a chemical equivalent below 250; and
(d) a milliosmolarity less than 150 per kg. of water on a Fiske osmometer.

Additionally, such an alginate solution may advantageously contain alginate insolubilizing ions in the form, for example, of a physiologically acceptable gluconate such as calcium gluconate. The vaccine should not, however, contain calcium or other insolubilizing ions of a concentration sufficient to precipitate as the insoluble alginate gel before injection of the vaccine into animals is made.

In the practice of the present invention, we have found it satisfactory to use a commercially available aqueous alginate solution of the above type which contains 4% weight/volume sodium alginate and 0.67% by weight calcium gluconate. The calcium gluconate content may range between about 0.4% and 0.8% by weight. An equal volume, for example, of such an aqueous solution may be added to the vaccine, prepared as described above, to further enhance its effectiveness and to produce a higher level of antibodies.

The novel vaccines of the invention are prepared utilizing a vehicle, preferably an aqueous solution, suitable for parenteral injection as by intramuscular, intradermal or intracutaneous injection into bovine animals.

As demonstrated by the animal studies described below, the vaccines of the invention produce a high level of antibodies in cattle inoculated therewith. Moreover, our vaccines, particularly those containing the above-described adjuvant, produce an immune response which is long-lasting, i.e., for at least a period of one hundred twenty days.

Two studies were carried out to demonstrate the practice and effectiveness of the vaccines and methods of the present invention.

In the first study, five vaccines were used. Two of these were complex polyvalent vaccines. One contained a mixture of Formalin-killed infectious bovine rhinotracheitis (IBR), bovine viral diarrhea (BVD) and parainfluenza-3 (PI-3) viruses plus sodium alginate as an adjuvant. The other vaccine contained a mixture of the same three killed viruses without the adjuvant. Three monovalent vaccines were also prepared, these containing sodium alignate as an adjuvant and the killed IBR, BVD and PI-3 viruses respectively. Each of the vaccines was suspended in a sterile aqueous medium as a vehicle suitable for parenteral administration.

All viruses used in preparing the above vaccines were grown in bovine embryonic trachea (BEmT) cell cultures. The cells were passed in minimum essential medium (MEM, cf. Eagle, H., "Amino Acid Metabolism in Mammalian Cell Cultures," Science, vol. 130, p. 432–437, 1959) with a fetal bovine serum concentration of 10 percent. The cells for stocks and virus propagation were serially passed in 16 oz. glass prescription bottles. A saline-trypsin-versene (STV) buffer solution was used to remove the cells from the surface of the glass. After centrifugation, the cells were resuspended in MEM plus serum, distributed in 16 oz. bottles at a concentration of $6 \times 10^4$ cells per ml. (30 ml. per 16 oz. bottle), and incubated at 37° C. A confluent cell monolayer formed in 4 days. The bovine trachea cell line was used in the serum assay procedures and to propagate the viruses.

All viruses employed were propagated by inoculating 0.3 ml. of $10^{-2}$ dilution stock virus into 16 oz. glass prescription bottles of washed, prepared bovine trachea cell monolayers and were incubated at 37° C. until a desired titer was achieved (e.g. 4 days). After harvesting of the virus, the tissue culture fluid containing the virus was tested for bacterial contamination by inoculation into thioglycollate medium and nutrient broth. The absence of bacterial growth after three days incubation at 37° C. gave evidence that the virus cultures were free from bacteria. The viruses in the tissue culture fluid were then assayed for hemagglutinating activity and neutralization studies using the microtiter technique.

Each of the viruses was suspended in an aqueous solution and inactivated with 0.4% Formalin (final concentration) and maintained for one week at 4° C. The two polyvalent vaccines were prepared by combining equal proportions of the three killed viral components, i.e. the IBR, BVD and PI-3 killed viruses. The vaccines with adjuvants were prepared by mixing the respective viral suspension or suspensions with an equal volume of an aqueous solution containing 4.0% weight/volume sodium alginate and 0.67% by weight calcium gluconate. This soluble alginate had the characteristics previously set out. The vaccines were then tested for bacterial contamination in nutrient and thioglycollate broth cultures and for residual viral activity in bovine embryonic trachea (BEmT) tissue culture.

The parainfluenza-3 (PI-3), strain SF-4, of virus used for vaccine production was serially passed in BEmT cells and a hemagglutination (HA) titer of 1:512 was obtained. Infectious bovine rhinotracheitis (IBR) was serially passed in the BEmT cells and a tissue culture infective dose ($TCID_{50}$) titer of $10^{7.2}$ per ml. was obtained. The bovine viral diarrhea virus (BVD) was passed 15 times in BEmT cells and a $TCID_{50}$ titer of $10^{5.8}$ per ml. was achieved. The $TCID_{50}$ titers were obtained by titrating the virus in a suspended cell system using a microtiter technique and the determinations were made using the method of Reed, L. J. and Muench, H., "A Simple Method of Estimating Fifty Percent Endpoints," Am. J. Hyg. 27, (1938): pp. 493–497.

Forty-five head of beef cattle, 23 heifers and 22 steers, of mixed Angus and Hereford breeds, each weighing 300–400 pounds, were employed as test animals in the first study. The animals ranged in age from 5–8 months. They had no history of vaccination against any of PI-3, or IBR, or BVD viruses. All animals were in good health at the onset of vaccination and there had been no history of clinical cases of shipping fever (PI-3) IBR, or BVD in the herd.

The 45 head of cattle were divided into ten groups. Groups II and III consisted of 3 and 2 animals, respectively, and the remaining eight groups had five animals per group. Twenty-five ml. of blood was obtained from each animal immediately prior to initial inoculation with vaccine. All serum samples were tested for antibodies against PI-3, IBR, and BVD using the HI test or the neutralization test described infra. The vaccines were parenterally administered by inoculating intramuscularly in the biceps fermoris with 10.0 ml. of vaccine or control mixture as indicated in Table 1. Cattle in Groups, IV, V, VI, IX, X were reinoculated with an additional 10.0 ml. of an identical preparation 38 days after the first injection. Blood samples of 25.0 ml. were obtained from all cattle on the following days subsequent to the initial injection: 3, 7, 10, 14, 17, 23, 31, 35, 38, 45, 52, 66, 87, and 120. Table I shows the composition of the vaccines used (prepared as described above) and the injection protocol employed for the cattle in Groups I–X.

TABLE I.—COMPOSITION OF VACCINES AND INJECTION PROTOCOL FOR CATTLE IN GROUPS I-X

| Group | Cattle No. | Composition of vaccines | Number of injections | Amount injected, ml. |
|---|---|---|---|---|
| I | 1-5 | Not injected | 0 | 0 |
| II | 6-8 | Adjuvant only | 1 | 10 |
| III | 9-10 | Minimum essential medium (MEM) only. | 1 | 10 |
| IV | 11-15 | Adjuvant plus IBR | 2 | 10 |
| V | 16-20 | Adjuvant plus BVD | 2 | 10 |
| VI | 21-25 | Adjuvant plus PI-3 | 2 | 10 |
| VII | 20-30 | Adjuvant plus BIR plus BVD plus PI-3. | 1 | 10 |
| VIII | 31-36 | IBR plus BVD plus PI-3 without adjuvant. | 1 | 10 |
| IX | 37-40 | Adjuvant plus IBR plus BVD plus PI-3. | 2 | 10 |
| X | 41-45 | IBR plus BVD plus PI-3 without Adjuvant. | 2 | 10 |

A microtiter technique developed by Sever and described in "Application of a Microtechnique to Viral Serological Investigations," J. Immunol. 88 (1962), pages 320–329, was used for the hemagglutination-activity (HA) and hemagglutination-inhibition (HI) tests described hereinafter.

As to HA procedure, the myxovirus PT-3 (Strain Sf-4) is capable of agglutinating the bovine, guinea pig, porcine and human type O erythrocytes. The highest HA titer is reached when either guinea pig or porcine erythrocytes are used. Guinea pig erythrocytes were used in the HA determinations.

The following dilutions of the PI-3–MEM suspension were used in the HA test: 1:10, 1:15, 1:20, 1:30, 1:40, 1:60, 1:80, 1:120, 1:160, 1:240, 1:320, 1:480, 1:640, and 1:960. One ml. of the initial 1:10 and 1:15 dilutions of the virus were prepared in Kahn tubes, and all succeeding HA and HI tests were performed using the above referred to microtiter procedure.

One of the main features of an antigen-antibody reaction is that the combination is a firm and specific one. Therefore, if the antigen is particulate, its corresponding homologous antibodies may easily be removed from a mixture of antibodies. Since the reaction is specific, this facilitates determining the specific antigens or antibodies present in the system, separating the antibodies if two or more kinds are present in the same serum, and concentrating the antibodies in the serum.

Tests were conducted to determine whether there was any immunological relationship between the three viruses used in preparing the vaccines described above in order to be able to carry out quantitative studies with the immune sera. It was necessary to adsorb out of the sera two of the viral antibody components before the third component could be analyzed. The procedure was carried out in 13 x 100 mm. dilution tubes using immune sera against PI-3, IBR and BVD which had been prepared in rabbits. To a 1.0 ml. aliquot of PI-3 immune serum diluted 1:10, was added 1.0 ml. containing a $10^6$ TCID/ml. suspension of IBR virus. To this aliquot of PI-3 immune serum diluted 1:10 was then added 1.0 ml. of $10^6$ TCID/ml. suspension of BVD virus. The tubes were incubated at 40° C. for 4½ hours and were titrated. Each of the other two remaining immune sera, IBR and BVD, were treated in a similar manner by adsorbing out heterologous antibodies in the sera.

Comparative tests were made of adsorbed and non-adsorbed serum. The tests resulted indicated that the viruses were not immunologically related.

The hemagglutinating activity of a virus can be inhibited by specific viral antiserum and has been termed hemagglutination-inhibition (HI). Certain materials found in animal fluids and tissue virus HA. These materials were removed from the serum before performing the HI tests.

Prior to carrying out the HI tests, nonspecific HA inhibitors were removed by adding 0.5 ml. of serum to a 4.5 kaolin suspension (25 gm. of acid-washed kaolin to 100 ml. saline solution). After thorough mixing, the samples were left at room temperature for 20 minutes and then centrifuged at 1500 r.p.m. for 10 minutes. The supernatant fluid was saved. The serum samples were then incubated at 56° C. for 30 minutes to remove the complement. This treatment resulted in a serum dilution of 1:10. A 1:15 dilution of each serum was obtained by adding 0.1 ml. of the 1:10 dilution to 0.05 ml. phosphate buffered saline. The 1:10 and 1:15 diluted samples were used to make the following dilutions in the HI test: 1:10, 1:15, 1:20, 1:30, 1:40, 1:60, 1:80, 1:120, 1:160, 1:240, 1:320, 1:480, 1:640, and 1:960.

An HA test was performed on each stock virus suspension in MEM to determined 4 HA units per 0.025 ml. After the dilution of the virus was determined, a standard amount of 4 HA units per sample was employed in the HI test.

0.025 ml. samples of a 1:10 dilution of serum and a 1:15 serum dilution were prepared. 0.025 ml. of phosphate buffered saline solution was added to all samples. 0.025 ml. of the viral suspension (4 HA units per 0.025 ml.) was then added to all samples and the samples were sealed. After incubation at room temperature (25° C.) for 30 minutes, 0.05 ml. of 0.5% guinea pig RBC was added to all samples. The samples were resealed, incubated at room temperature for 30 minutes, and the results recorded. Known negative and positive antisera were included in each determination as controls. The HI titer was established as the last dilution in each group of samples to show complete inhibition of HA.

A hemadsorption technique, using the bovine trachea cell line supplemented the HI test. When appropriate erythrocytes are added to cell cultures infected with influenza virus, the erythrocytes will adsorb to the infected cell surface. The phenomenon of hemadsorption is dependent upon selective attachment of erythrocytes onto the monolayer surface of tissue culture cells. It is demonstrated by the addition of erythrocytes to a tissue culture system in which propagation of hemagglutinin-producing virus has occurred.

Serum specimens were treated similarly to those in the HI test. The sera were incubated at 56° C. for 30 minutes to remove the complement and were then diluted to 1:10 with phosphate buffered saline dilution tubes. A 1:15 dilution of each serum was obtained by adding 0.1 ml. of the 1:10 dilution to 0.05 ml. of phosphate suffered saline. The 1:10 and 1:15 diluted samples were used to make the following dilutions used in the hemadsorption test: 1:10, 1:15, 1:20, 1:30, 1:40, 1:60, 1:80, 1:120, 1:160, 1:240, 1:320, 1:480, 1:640, and 1:960.

An HA test was performed on each stock virus suspension in MEM to determine 4 HA units per 0.1 ml. After determining the dilution of virus that contained 4 HA units, the dilution that contained 4 HA units could be calculated and used as the standard amount of virus for each bottle in the hemadsorption test.

The following procedure was used in carrying out the hemadsorption tests. Bovine trachea cell monolayers were prepared in 1 oz. bottles with MEW plus fetal calf serum growth medium. The growth medium was poured from the monolayers and the cell sheet was washed twice with phosphate buffered saline. One-tenth ml. of the appropriate virus-serum mixture was added to each bottle, and the bottle was then rotated to assure complete coverage of the monolayer by the mixture. The monolayers with the virus-serum mixtures were allowed to adsorb for 1 hour at room temperature (25° C.). After the 1 hour adsorption period, 2.5 ml. of MEM maintenance medium was added to each bottle, and the bottles were sealed and incubated at 37° C. for 72 hours. The bottles were removed from the incubator and 0.4 ml. of a 0.5 percent suspension of washed guinea pig erythrocytes was added to each bottle, and the bottles were incubated at 4° C. for 30 minutes. Hemadsorption was observed in bottles where unneutralized virus had infected the cells. Hemadsorption was not observed in bottles where neutralized virus had failed to infect the cells. The hemadsorption titer was established as the highest dilution to show a positive reaction.

Antibody with specificity for certain antigens of virus particles can neutralize the infectivity of the virus by combining with the viral antigen and preventing viral multiplication. Neutralizing antibody can be detected by the inoculation of prepared virus antiserum mixtures into susceptible animals or onto the surface of mamalian tissue cultures. The neutralization test demonstrates the appearance or rise intiter of antibody during the course of illness or vaccination.

Tissue culture methods employing bovine trachea cells were utilized to determine the neutralizing capacity of the produced antibody. Serial ten-fold stock virus dilutions of $10^{-1}$ through $10^{-8}$ were prepared. The antiserum was incubated at 56° C. for 30 minutes to inactivate the complement and was substantially diluted to 1:10, 1:100 and 1:1000. Undiluted serum was also used. Non-immune serum was treated in the same manner. One ml. of each virus dilution was combined with an equal amount of each antiserum dilution and incubated at room temperature for 1 hour. A 0.025 ml. quantity of each mixture was added to a suspended system of bovine trachea cells. The bovine trachea cell concentration was $2.5 \times 10^5$ cells per sample. Virus-phosphate buffered saline mixtures and virus-normal serum were used as controls. The virus-serum-cell system was incubated for 6 days at 37° C. at which time the cells were observed for cytopathological effects. The $ID_{50}$ titers were determined by the Reed and Muench technique mentioned supra, and the neutralization indices (NI) were calculated by subtracting the log of the titer of the virus mixed with immune serum from the titer of the control virus.

In discussing the results of the above first study, the following terminology will be used for convenience to designate the vaccines employed. The three monovalent vaccines are designated I. Of these, IA is IBR, IB is BVD, and IC is PI-3. Vaccine II refers to the polyvalent vaccine of the invention without the adjuvant and Vaccine III to the polyvalent vaccine with adjuvant.

Cattle in Groups II through X, as shown in Table I, were injected with a vaccine composed of either adjuvant only, MEM only, a single virus plus adjuvant (Vaccine I), triple virus without the adjuvant (Vaccine II), or triple virus plus adjuvant (Vaccine III), and did not show any evidence of hypersensitivity or any other outward reactions as a result of experimental inoculations.

Figure 1:
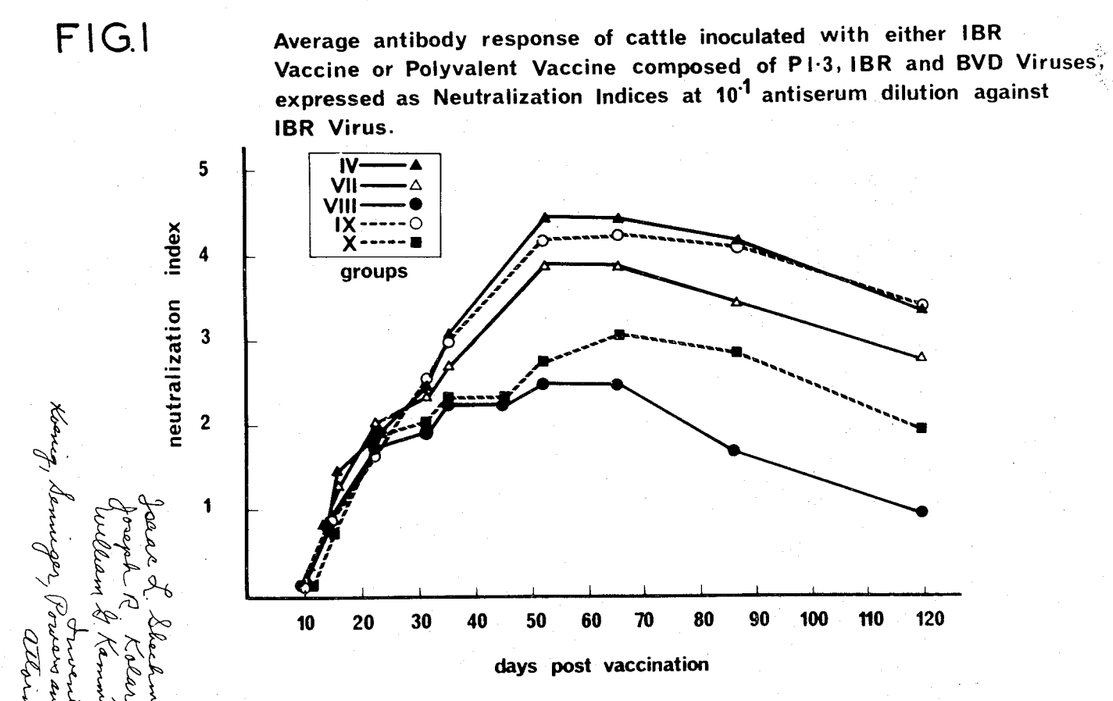
FIG. 1 is a graph showing the average antibody response of cattle to infectious bovine rhinotracheitis virus when inoculated with either infectious bovine rhinotracheitis monovalent vaccine or the polyvalent vaccine of the present invention.

The mean values of the neutralizing activity of the antisera against IBR virus are presented in Table II and FIG. 1.

TABLE II.—AVERAGE ANTIBODY RESPONSE OF CATTLE INOCULATED WITH EITHER IBR VACCINE OR POLYVALENT VACCINE COMPOSED OF PI-3, IBR, AND BVD VIRUSES, EXPRESSED AS NEUTRALIZATION INDICES AGAINST IBR VIRUS

| Day post-vaccination | Reciprocal of anti-serum dil. | Group |  |  |  |  |
|---|---|---|---|---|---|---|
|  |  | IV | VII | VIII | IX | X |
| 14 | 0 | 2.1 | 2.2 | 1.7 | 2.1 | 1.9 |
|  | 10 | 0.9 | 0.9 | 0.8 | 0.9 | 0.8 |
|  | 100 | 0 | 0 | 0 | 0 | 0 |
| 17 | 0 | 2.6 | 2.4 | 2.5 | 2.0 | 2.6 |
|  | 10 | 1.4 | 1.2 | 1.3 | 1.2 | 1.3 |
|  | 100 | 0.3 | 0.1 | 0.2 | 0.1 | 0.1 |
| 23 | 0 | 3.0 | 3.1 | 2.9 | 2.7 | 3.0 |
|  | 10 | 1.8 | 1.9 | 1.7 | 1.8 | 1.8 |
|  | 100 | 0.9 | 0.9 | 0.8 | 0.8 | 0.8 |
| 31 | 0 | 3.7 | 3.7 | 3.2 | 3.8 | 3.2 |
|  | 10 | 2.6 | 2.5 | 1.9 | 2.5 | 1.9 |
|  | 100 | 1.5 | 1.4 | 0.9 | 1.4 | 1.0 |
|  | 1,000 | 0.4 | 0.6 | 0.1 | 0.2 | 0 |
| 35 | 0 | 4.3 | 4.2 | 3.4 | 4.1 | 4.6 |
|  | 13 | 3.2 | 2.8 | 2.2 | 3.2 | 2.2 |
|  | 100 | 2.2 | 1.0 | 1.1 | 2.1 | 1.1 |
|  | 1,000 | 1.0 | 0.8 | 0.3 | 1.2 | 0 |
| 45 | 0 | *4.7 | 4.5 | 3.4 | *4.9 | *3.4 |
|  | 10 | 3.9 | 3.6 | 2.2 | 3.8 | 2.2 |
|  | 100 | 2.9 | 2.6 | 1.3 | 1.6 | 1.3 |
|  | 1,000 | 2.1 | 1.7 | 0.2 | 0.2 | 0 |
| 52 | 0 | 5.1 | 4.7 | 3.7 | 5.0 | 3.9 |
|  | 13 | 4.5 | 3.9 | 2.5 | 4.2 | 2.7 |
|  | 140 | 3.4 | 2.8 | 1.4 | 3.2 | 1.7 |
|  | 1,000 | 2.1 | 1.6 | 0.2 | 2.0 | 0.4 |
| 66 | 0 | 5.2 | 4.7 | 3.8 | 5.2 | 3.9 |
|  | 10 | 4.5 | 3.9 | 2.5 | 4.3 | 2.8 |
|  | 100 | 3.5 | 2.9 | 1.4 | 3.2 | 1.6 |
|  | 1,000 | 2.3 | 2.1 | 0.6 | 2.1 | 0.3 |
| 87 | 0 | 5.1 | 4.7 | 2.9 | 5.1 | 3.9 |
|  | 10 | 4.3 | 3.5 | 1.7 | 4.3 | 2.7 |
|  | 100 | 3.3 | 2.6 | 0.8 | 3.2 | 1.6 |
|  | 1,000 | 2.1 | 1.3 | 0 | 1.9 | 0.3 |
| 120 | 0 | 4.3 | 3.9 | 2.1 | 4.3 | 3.2 |
|  | 10 | 3.5 | 2.8 | 0.9 | 3.5 | 2.0 |
|  | 100 | 2.6 | 1.8 | 0.1 | 2.1 | 1.2 |
|  | 1,000 | 1.7 | 0.6 | 0 | 1.0 | 0 |

*Animals in groups IV, IX, and X were given a second injection of antigen 38 days after the initial injection.

NOTE: Antibodies not detected in groups I, II, and III at any time.

In FIG. 1 the neutralization index is plotted against the number of days post vaccination. The neutralizing antibodies to IBR virus were first observed in a $10^{-1}$ antiserum dilution on the 14th day after vaccination. Titrations of sera from earlier periods after vaccination did not indicate any activity that could be ascribed to antibodies. Consequently, these values are omitted from the tables. In animals from Group IV, injected twice with Vaccine IA, neutralizing titers reached the maximum value by the 28th day after the second injection. Similarly, in Group IX, the highest antibody response to two injections of Vaccine III also occurred at the same time. The neutralization indices of the two groups, IV and IX, began decreasing at the 87th day after the initial vaccination. Sera from animals in Group VII, injected once with Vaccine III, reached maximum antibody activity on the 66th day following initial vaccination. Groups VIII and X which received one and two injections, respectively, of Vaccine II also reached a peak of antibody activity at the 66th day after vaccination. By the 87th day after vaccination, the neutralizing titers of the serum began decreasing. Injection of vaccines without adjuvant did not produce as high an antibody response as did the vaccines that were prepared with adjuvant.

Figure 2:
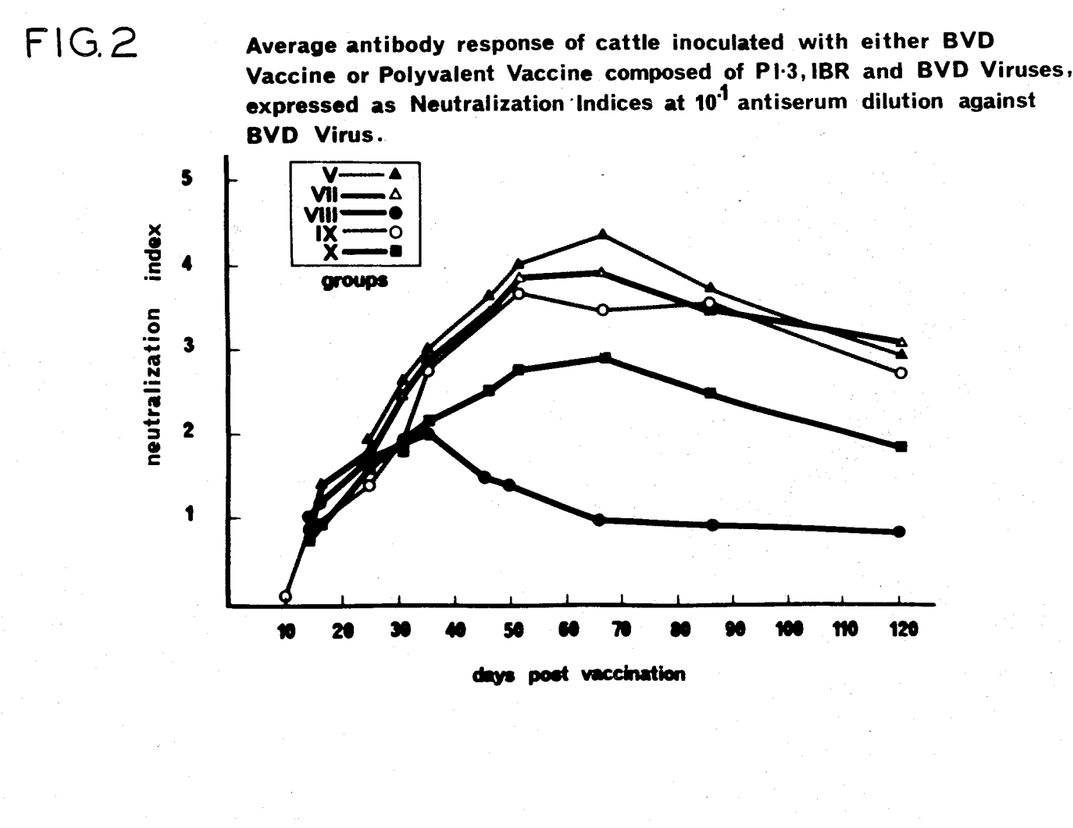
FIG. 2 is a graph showing the average antibody response of cattle to bovine viral diarrhea virus when inoculated with either bovine viral diarrhea monovalent vaccine or a polyvalent vaccine according to the present invention.

The mean values of neutralizing antibodies in the sera to BVD are presented in Table III and FIG. 2.

TABLE III.—AVERAGE ANTIBODY RESPONSE OF CATTLE INOCULATED WITH EITHER BVD VACCINE OR POLYVALENT VACCINE COMPOSED OF PI-3, IBR, AND BVD VIRUSES EXPRESSED AS NEUTRALIZATION INDICES AGAINST BVD VIRUS

| Serum obtained on indicated day post-vaccination | Reciprocal of anti-serum dil. | Group | | | | |
|---|---|---|---|---|---|---|
| | | V | VII | VIII | IX | X |
| 14 | 0 | 2.0 | 1.9 | 1.8 | 2.1 | 2.0 |
| | 10 | 0.9 | 0.8 | 0.8 | 0.9 | 0.7 |
| | 100 | 0 | 0 | 0 | 0 | 0 |
| 17 | 0 | 2.1 | 2.0 | 2.3 | 2.4 | 2.1 |
| | 10 | 1.3 | 1.3 | 1.1 | 1.1 | 0.9 |
| | 100 | 0.2 | 0.2 | 0.4 | 0 | 0 |
| 23 | 0 | 3.0 | 2.9 | 2.8 | 2.7 | 2.8 |
| | 10 | 1.9 | 1.7 | 1.6 | 1.4 | 1.5 |
| | 100 | 0.8 | 0.8 | 0.6 | 0.6 | 0.6 |
| 31 | 0 | 3.8 | 3.6 | 3.0 | 3.2 | 2.9 |
| | 10 | 2.6 | 2.4 | 1.8 | 1.9 | 1.8 |
| | 100 | 1.8 | 1.3 | 0.9 | 0.9 | 0.9 |
| | 1,000 | 1.0 | 0.5 | 0.1 | 0 | 0.1 |
| 35 | 0 | 3.8 | 3.8 | 3.2 | 3.9 | 3.3 |
| | 10 | 3.0 | 2.9 | 2.0 | 2.8 | 2.1 |
| | 100 | 2.2 | 1.9 | 1.1 | 1.8 | 1.1 |
| | 1,000 | 1.3 | 1.0 | 0.9 | 0.9 | 0.2 |
| 45 | 0 | *4.5 | 4.7 | 2.8 | *4.7 | *3.6 |
| | 10 | 3.7 | 3.5 | 1.5 | 3.5 | 2.4 |
| | 100 | 2.7 | 2.4 | 0.6 | 2.5 | 1.4 |
| | 1,000 | 1.5 | 1.2 | 0 | 1.3 | 0.6 |
| 52 | 0 | 4.8 | 4.5 | 2.7 | 4.8 | 3.9 |
| | 10 | 4.0 | 3.8 | 1.4 | 3.7 | 2.7 |
| | 100 | 2.9 | 2.8 | 0.6 | 2.6 | 1.6 |
| | 1,000 | 1.7 | 1.6 | 0 | 1.4 | 0.8 |
| 66 | 0 | 5.2 | 5.1 | 2.3 | 4.8 | 4.1 |
| | 10 | 4.3 | 3.9 | 1.1 | 3.6 | 2.9 |
| | 100 | 3.2 | 2.9 | 0.2 | 2.7 | 1.8 |
| | 1,000 | 2.0 | 2.0 | 0 | 1.5 | 0.7 |
| 87 | 0 | 4.8 | 4.7 | 2.0 | 4.7 | 3.8 |
| | 10 | 3.7 | 3.5 | 0.9 | 3.6 | 2.6 |
| | 100 | 2.5 | 2.7 | 0 | 2.6 | 1.6 |
| | 1,000 | 1.3 | 1.4 | 0 | 1.5 | 0.3 |
| 120 | 0 | 4.1 | 4.3 | 1.7 | 3.8 | 3.6 |
| | 10 | 3.0 | 3.1 | 0.8 | 2.9 | 1.8 |
| | 100 | 1.9 | 2.1 | 0 | 1.9 | 0.7 |
| | 1,000 | 0.8 | 0.9 | 0 | 0.7 | 0 |

*Animals in groups V, IX, and X were given a second injection of antigen on 38 days after the initial injection.

NOTE: No antibodies detected in groups I, II, and III at any time.

As in the case with IBR, antibodies to BVD were first observed in the $10^{-1}$ antiserum dilution at the 14th day after vaccination. Two injections of vaccine IB caused an antibody response that reached a maximum level on the 28th day following injection. By the 87th day following the initial vaccination, the neutralizing activity of the immune serum began to decrease. The animals in Group VII, which received one injection of Vaccine III, produced a maximum response on the 66th day after injection, but the antibody activity of the sera decreased by the 87th day. The cattle in Group IX, receiving two injections of Vaccine III, reached a maximum level of antibody production at the 14th day subsequent to the second injection and began decreasing by the 49th day after the second inoculation. Animals in Group VIII, having received a single injection of Vaccine II, reached their peak of neutralizing activity against BVD at the 45th day after vaccination, and the antibody titer of the immune serum began decreasing by the 52nd day post vaccination. Cattle in Group X, injected twice with Vaccine II, reached a peak of neutralizing activity at the 28th day after the second injection, and the antibody titer began decreasing by the 49th day subsequent to the second injection.

Figure 3:
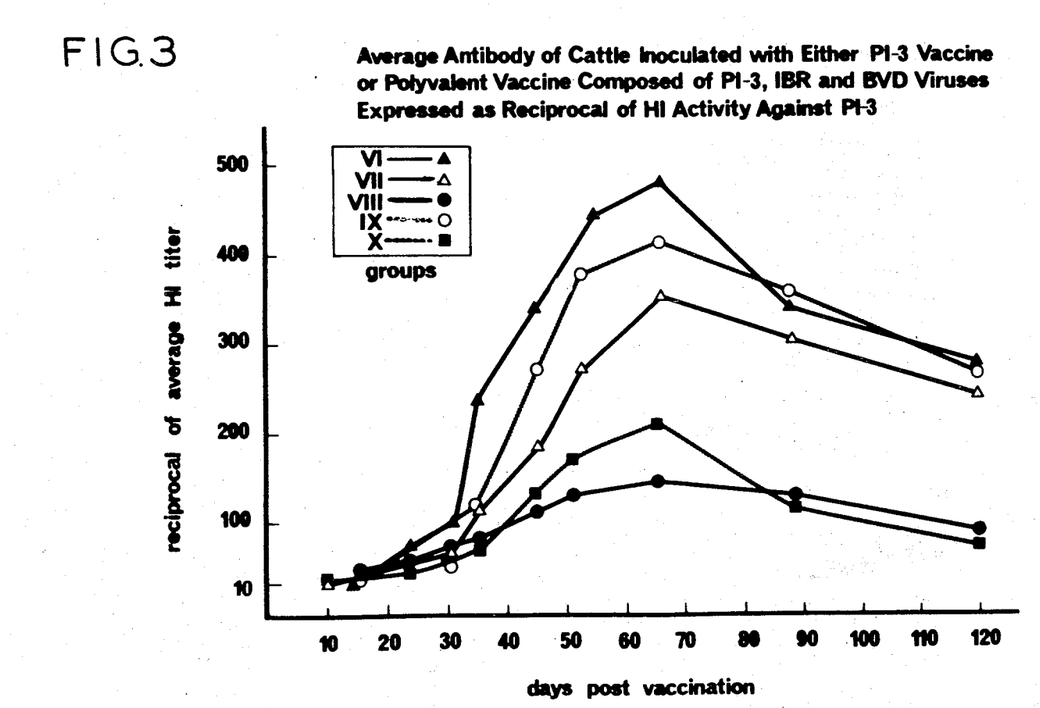
FIG. 3 is a graph showing the average antibody of cattle to parainfluenza-3 virus when inoculated with either parainfluenza-3 monovalent vaccine or a polyvalent vaccine according to the present invention.

The HI activity of the immune sera against PI-3 virus is presented in Table IV and FIG. 3.

TABLE IV.—AVERAGE ANTIBODY RESPONSE OF CATTLE INOCULATED WITH EITHER PI-3 VACCINE OR POLYVALENT VACCINE COMPOSED OF PI-3, IBR, AND BVD VIRUSES EXPRESSED AS RECIPROCAL OF HI ACTIVITY AGAINST PI-3

| Serum obtained on indicated day post-vaccination | Group | | | | |
|---|---|---|---|---|---|
| | VI | VII | VIII | IX | X |
| 3 | 10 | 10 | 10 | 10 | 10 |
| 7 | 10 | 10 | 10 | 10 | 10 |
| 10 | 10 | 10 | 10 | 10 | 10 |
| 14 | 22 | 10 | 16 | 10 | 15 |
| 17 | 38 | 20 | 30 | 18 | 26 |
| 23 | 72 | 30 | 34 | 34 | 34 |
| 31 | 100 | 64 | 64 | 52 | 48 |
| 35 | 220 | 104 | 72 | 108 | 80 |
| 38 | (¹) | (²) | (²) | (¹) | (¹) |
| 45 | 335 | 192 | 104 | 272 | 120 |
| 52 | 448 | 288 | 128 | 384 | 176 |
| 66 | 480 | 352 | 144 | 416 | 208 |
| 87 | 384 | 304 | 128 | 368 | 112 |
| 120 | 288 | 256 | 92 | 272 | 84 |

¹ Second injection.
² Not done.

NOTE: All titers of 10 are ≤10. The indicated HI titers are based on a rise above a base line of 10. Groups I, II, and III showed no rise in antibody titer above a base line of 10.

HI antibodies toward PI-3 were first observed on the 14th day after vaccination. Maximum HI activity of the sera from cattle in Group VI, having received two injections of the Vaccine IC, was observed at the 28th day following the second injection, and the titer began decreasing by the 49th day after the second inoculation. Sera from Group VII, which received one injection of Vaccine III, reached a maximum HI titer at 66 days after vaccination. By the 87th day following vaccination, the HI activity of the immune sera began to decrease. Cattle in Group IX, which received two injections of Vaccine III, also produced a maximum antibody response to PI-3 at the 66th day following the initial injection. The antibody level of the sera decreased by the 87th day after the initial vaccination. Animals in Group X, inoculated twice with Vaccine II, produced a maximum response to PI-3 28 days following the second vaccination, and by the 49th day subsequent to the second injection the antibody level began to decrease.

Figure 4:
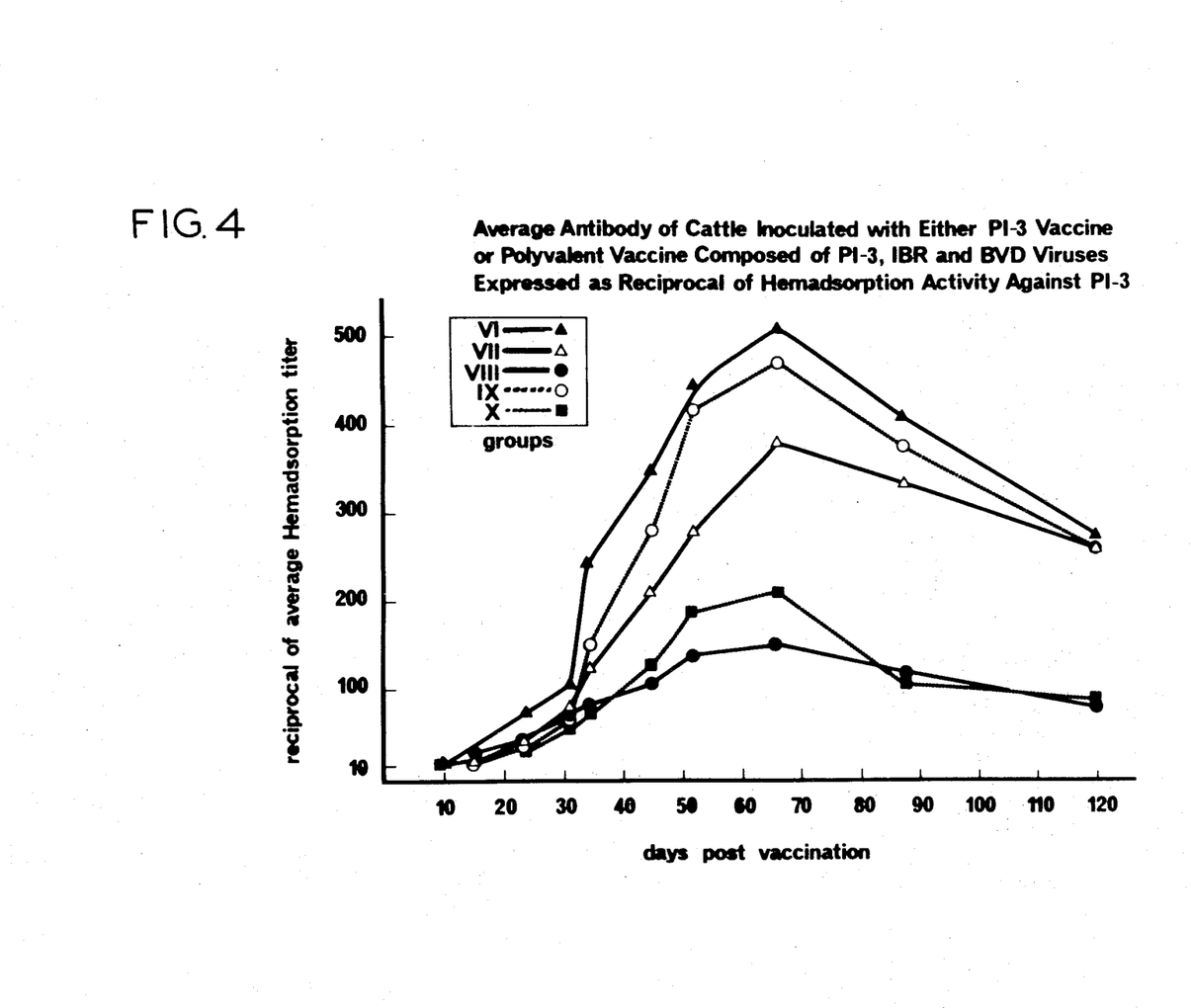
FIG. 4 is a graph showing the average antibody of cattle to parainfluenza-3 virus when inoculated with either parainfluenza-3 monovalent vaccine or a polyvalent vaccine in accordance with the present invention expressed on a different basis than in FIG. 3.

Antibody activity of the sera toward PI-3 was also determined by the procedure of hemadsorption inhibition (HAdI). The mean values of the HAdI activity are recorded in Table V and FIG. 4.

TABLE V.—AVERAGE ANTIBODY RESPONSE OF CATTLE INOCULATED WITH EITHER PI-3 VACCINE OR POLYVALENT VACCINE COMPOSED OF PI-3, IBR, AND BVD VIRUSES EXPRESSED AS RECIPROCAL OF HEMADSORPTION ACTIVITY AGAINST PI-3

| Serum obtained on indicated day post-vaccination | Group | | | | |
|---|---|---|---|---|---|
| | VI | VII | VIII | IX | X |
| 3 | 10 | 10 | 10 | 10 | 10 |
| 7 | 10 | 10 | 10 | 10 | 10 |
| 10 | 10 | 10 | 10 | 10 | 10 |
| 14 | 26 | 12 | 18 | 10 | 17 |
| 17 | 42 | 18 | 30 | 19 | 28 |
| 23 | 76 | 34 | 36 | 38 | 38 |
| 31 | 104 | 72 | 68 | 60 | 56 |
| 35 | 256 | 120 | 80 | 144 | 80 |
| 38 | (¹) | (²) | (²) | (¹) | (¹) |
| 45 | 352 | 208 | 104 | 288 | 120 |
| 52 | 448 | 288 | 136 | 416 | 192 |
| 66 | 512 | 384 | 144 | 480 | 208 |
| 87 | 416 | 336 | 120 | 384 | 112 |
| 120 | 288 | 272 | 84 | 272 | 88 |

¹ Second injection.
² Not done.

NOTE: All titers of 10 are ≤10. The indicated hemadsorption titers are based on a rise above a base line of 10. Groups I, II, III showed no rise in antibody titer above a base line of 10.

The HAdI titers parallel the HI titers, but the HAdI test is more sensitive than the HI test. An analysis of the HAdI activity of the immune sera toward PI-3 would be repetitious of the HI activity analysis. An inspection of the HAdI titers in Table V and FIG. 4 reveals the similarity in antibody activity to HI titers found in Table IV and FIG. 3.

Figure 5:
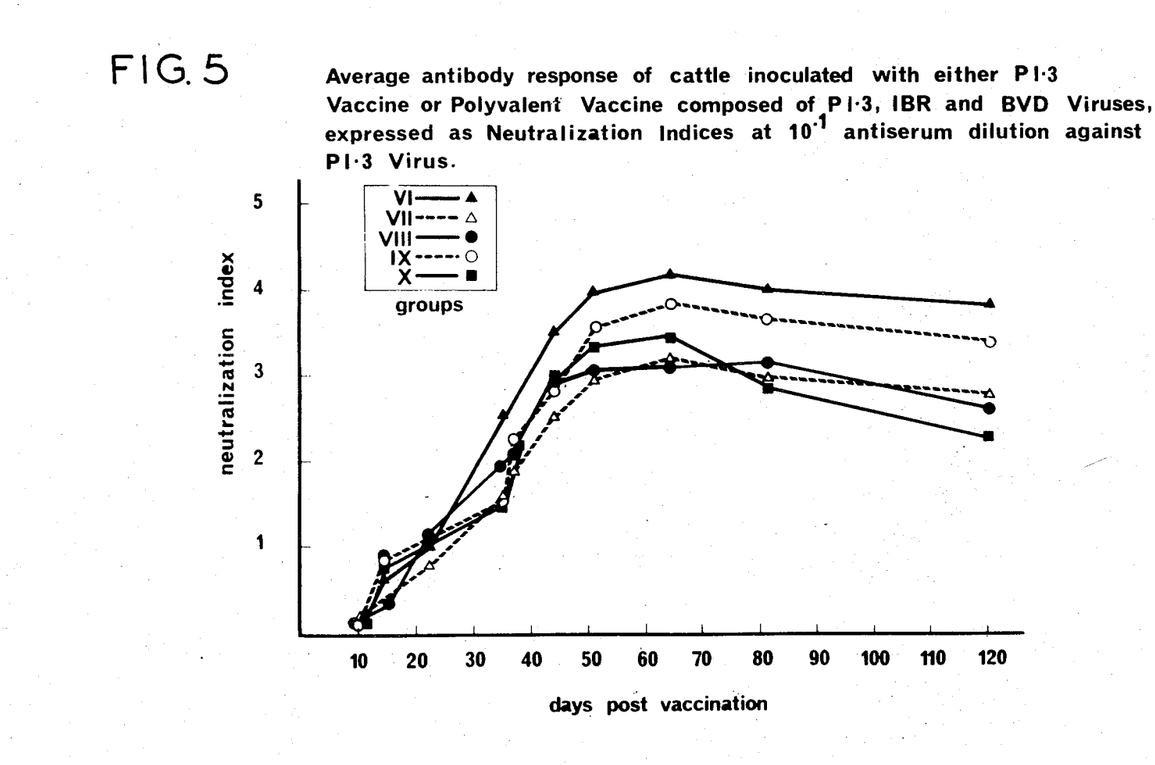
FIG. 5 is a graph showing the average antibody response of cattle to parainfluenza-3 virus when inoculated with either parainfluenza-3 monovalent vaccine or a polyvalent vaccine according to the present invention expressed on still another basis.

The average neutralizing activity of the immune sera toward PI-3 is recorded in Table VI and FIG. 5.

TABLE VI.—AVERAGE ANTIBODY RESPONSE OF CATTLE INOCULATED WITH EITHER PI-3 VACCINE OR POLYVALENT VACCINE COMPOSED OF PI-3, IBR, AND BVD VIRUSES EXPRESSED AS NEUTRALIZATION INDICES AGAINST PI-3 VIRUS

| Day post-vaccination | Reciprocal of anti-serum dil. | Group | | | | |
|---|---|---|---|---|---|---|
| | | IV | VII | VIII | IX | X |
| 14 | 0 | 1.2 | 1.3 | 1.1 | 1.4 | 1.4 |
| | 10 | 0.4 | 0.2 | 0.3 | 0.2 | 0.2 |
| | 100 | 0 | 0 | 0 | 0 | 0 |
| 17 | 0 | 1.4 | 1.3 | 1.6 | 1.6 | 1.6 |
| | 10 | 0.6 | 0.5 | 0.8 | 0.8 | 0.8 |
| | 100 | 0 | 0 | 0 | 0 | 0 |
| 23 | 0 | 1.9 | 1.7 | 1.9 | 1.8 | 2.1 |
| | 10 | 1.1 | 0.8 | 1.2 | 1.0 | 1.1 |
| | 100 | 0.2 | 0 | 0.2 | 0 | 0 |
| 31 | 0 | 2.7 | 2.2 | 2.9 | 2.6 | 2.2 |
| | 10 | 1.9 | 1.5 | 1.8 | 1.5 | 1.4 |
| | 100 | 0.7 | 0.3 | 0.7 | 0.7 | 0.5 |
| | 1,000 | 0 | 0 | 0 | 0 | 0 |
| 35 | 0 | 3.2 | 3.0 | 3.3 | 4.4 | 3.2 |
| | 10 | 2.4 | 1.9 | 2.1 | 2.3 | 2.3 |
| | 100 | 1.1 | 0.7 | 0.9 | 1.1 | 1.4 |
| | 1,000 | 0 | 0 | 0 | 0.2 | 0.2 |
| 45 | 0 | *4.4 | 4.3 | 3.9 | *3.6 | *3.6 |
| | 10 | 3.6 | 2.6 | 2.8 | 2.8 | 2.9 |
| | 100 | 2.3 | 1.8 | 2.0 | 1.6 | 2.1 |
| | 1,000 | 1.2 | 0.7 | 0.9 | 0.8 | 1.3 |
| 52 | 0 | 4.5 | 4.1 | 4.2 | 4.4 | 4.6 |
| | 10 | 3.9 | 3.0 | 3.1 | 3.6 | 3.3 |
| | 100 | 2.7 | 1.8 | 2.3 | 2.2 | 2.5 |
| | 1,000 | 1.4 | 1.1 | 1.1 | 0.9 | 1.2 |
| 66 | 0 | 4.9 | 4.1 | 4.4 | 4.4 | 4.2 |
| | 10 | 4.2 | 3.3 | 3.2 | 3.8 | 3.5 |
| | 100 | 3.0 | 2.1 | 2.0 | 3.0 | 2.3 |
| | 1,000 | 1.8 | 0.9 | 0.8 | 2.2 | 1.5 |
| 87 | 0 | 4.8 | 4.0 | 4.2 | 4.1 | 3.9 |
| | 10 | 4.1 | 3.1 | 3.2 | 3.7 | 3.0 |
| | 100 | 2.9 | 2.0 | 1.9 | 2.3 | 1.9 |
| | 1,000 | 1.4 | 0.9 | 1.0 | 1.4 | 0.7 |
| 120 | 0 | 4.4 | 3.6 | 3.8 | 3.9 | 3.6 |
| | 10 | 3.7 | 2.8 | 2.7 | 3.3 | 2.5 |
| | 100 | 2.4 | 1.7 | 1.6 | 2.0 | 1.7 |
| | 1,000 | 1.1 | 0.5 | 0.8 | 0.8 | 0.5 |

*Animals in Groups VI, IX, and X were given a second injection of antigen 38 days after the initial injection.

NOTE: Antibodies not detected in Groups I, II, and III at any time.

Antibodies toward PI-3 were first demonstrated in a $10^{-1}$ dilution of antiserum 14 days after initial vaccination. Maximum neutralizing activity of the serum in the cattle of Group VI, which received two injections of the Vaccine IC, was recorded on the 28th day after the second injection. The antibody level began decreasing by the 49th day subsequent to the second inoculation. Animals in Group VII, injected once with Vaccine III, developed a maximum response to PI-3 66 days following the initial vaccination. By the 87th day post vaccination, the NI of neutralization index began to decrease. Maximum neutralizing activity of sera from Group VIII, having received one injection of Vaccine II, was reached at the 66th day after the initial injection and began decreasing by the 87th day post vaccination. Animals in Group IX, which received two injections of Vaccine III, developed maximum neutralization titers in the sera at the 28th day following the second injection, and by the 49th day after the second inoculation, the neutralizing activity began decreasing. Maximum neutralizing antibodies in the sera from cattle in Group X, having received two injections of the Vaccine II, were also recorded 28 days following the second injection, and by the 49th day the titer had begun to decrease.

From the above test results, it may be seen that the adjuvant-polyvalent vaccine (Vaccine III) produced a higher level of antibodies than did the complex vaccine without the adjuvant (Vaccine II). Antibodies to the three viruses persisted for over four months in the sera of animals injected twice with the adjuvant-containing vaccine. The test results also indicate that the three killed viruses of the polyvalent vaccines of the invention do not interfere with each other and that the viruses may be administered in a single polyvalent vaccine.

A second study was carried out employing three vaccines. The first vaccine was a polyvalent vaccine (Vaccine I) consisting of equal proportions of bovine viral diarrhea virus, Southern Illinois University strain (BVD–SIU), infectious bovine rhinotracheitis virus, Southern Illinois University strain (IBR–SIU) and parainfluenza-3 (SF–4), Southern Illinois University strain (PI–SIU). The second vaccine (Vaccine II) was a polyvalent vaccine consisting of equal proportion of the above three viruses and of *Pasteurella multocida*, an organism frequently isolated along with PI-3 in cases of shipping fever. The third vaccine (Vaccine III) was a polyvalent vaccine consisting of equal proportions of BVD and IBR viruses (Goff strains obtained from Affiliated Laboratories, Whitehall, Ill.) and the PI-3–SIU virus. Each of the vaccines was prepared with a sodium alginate adjuvant composed of an aqueous solution containing 4.0% weight/volume of sodium alginate and 0.68% by weight calcium gluconate. The adjuvant was mixed in a 1:1 ratio with the suspension of viruses for the complete vaccine in each instance.

The PI-3–SIU virus employed was serially passed five times in bovine embryonic trachea (BEmT) cells and a hemagglutination (HA) titer of 1:640 was achieved. The IBR–SIU and IBR–Goff viruses were serially passed six times each and tissue culture infective dose ($TCID_{50}$) titers of $10^{7.2}$ and $10^{7.4}$, respectively, were reached. The BVD–SIU and BVD–Goff viruses were serially passed seven times in BEmT cells and $TCID_{50}$ titers of $10^{6.8}$ and $10^{6.7}$, respectively, were achieved. Vaccine III which incorporated *Pascteurella multocida* contained $1 \times 10^9$ organisms per ml.

All viruses employed were propagated as previously described and each virus was inactivated with 0.4% Formalin (final concentration) and maintained for one week at 4° C. All other procedures employed in the first study were followed in the second study.

Thirty-six head of beef cattle, 22 heifers and 14 steers, of Hereford breed, each weighing 750–950 pounds, were employed as test animals in the second study. The animals were 15 months old. They had no history of vaccination and there had been no history of clinical cases of shipping fever, IBR, or BVD in the herd.

The thirty-six head of cattle were divided into five groups. The vaccines were parenterally administered by inoculating the animals intramuscularly in the biceps femoris muscle using disposable 19-gauge needles and syringes. The same procedures described above for the first study were used in carrying out the same tests in the second study.

Table VII shows the composition of the vaccines and the injection protocol employed in the second study.

TABLE VII.—COMPOSITION OF VACCINES AND INJECTION PROTOCOL FOR CATTLE IN GROUPS I–V

| Group | Cattle No. | Composition of vaccines | Number of injections | Amount injected, ml. |
|---|---|---|---|---|
| I | 7 | Not injected | 0 | 0 |
| II | 7 | SIU strains of IBR, BVD, PI-3. | 2 | 5 |
| III | 7 | ....do.... | 2 | 10 |
| IV | 7 | SIU strains of IBR, BVD, PI-3 and *Past. multocida*. | 2 | 5 |
| V | 8 | IBR-Goff, BVD-Goff, PI-3-SIU. | 2 | 5 |

The procedures for determining the antibody levels in the sera of animals in the second study were similar to that of the first study, except for two minor variations which did not affect the results.

Figure 6:
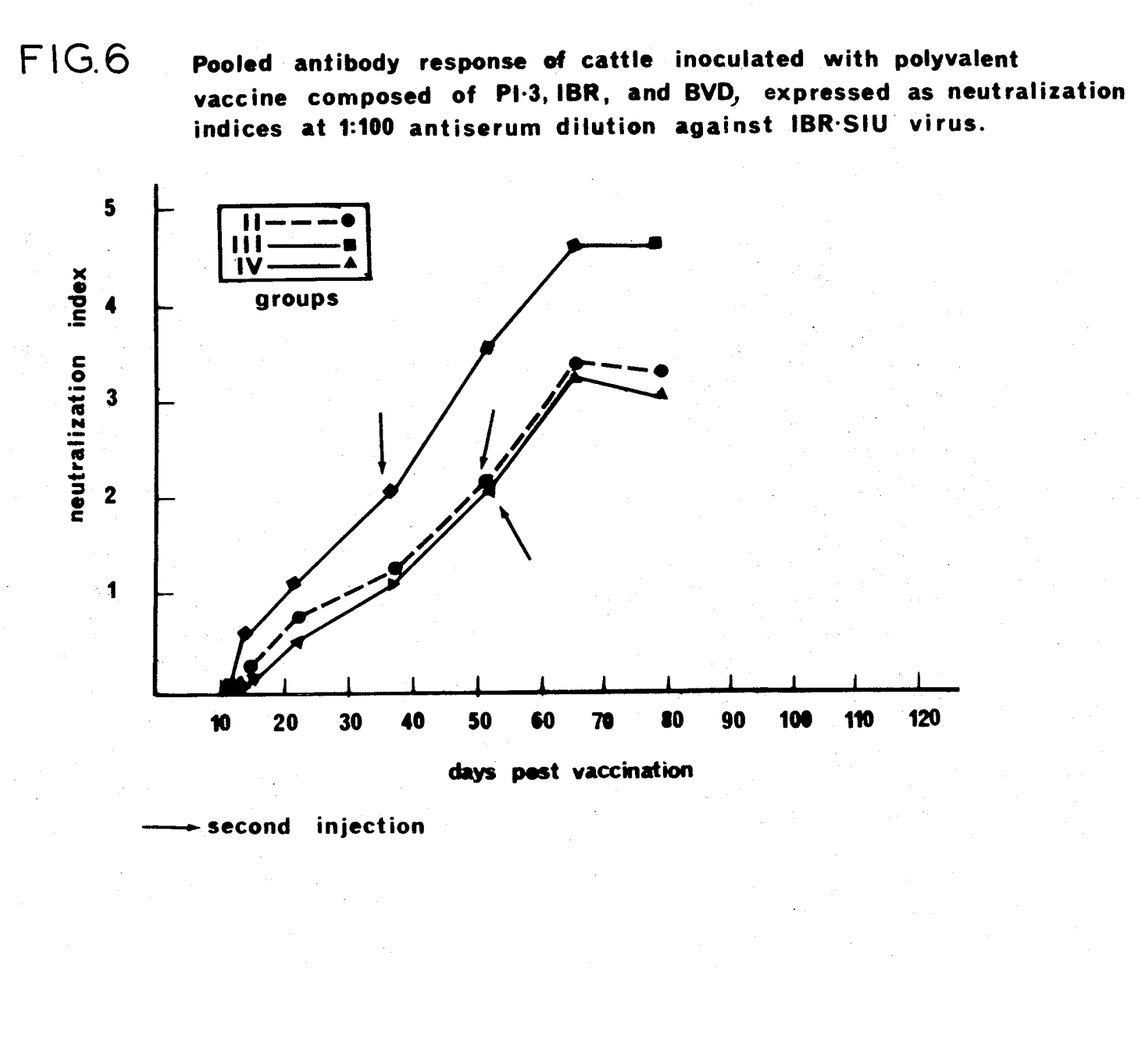
FIG. 6 is a graph showing the pooled antibody response of cattle to infectious bovine rhinotracheitis virus when inoculated with a polyvalent vaccine of the present invention.

The means neutralization values of antisera against IBR-SIU virus are presented in Table VIII and FIG. 6.

TABLE VIII.—AVERAGE ANTIBODY RESPONSE OF CATTLE INOCULATED WITH POLYVALENT VACCINE COMPOSED OF PI-3, IBR, AND BVD VIRUSES EXPRESSED AS NEUTRALIZATION INDICES AT A 1:100 ANTISERUM DILUTION AGAINST IBR-SIU

| Day post-vaccination | Groups | | | |
|---|---|---|---|---|
| | I | II | III | IV |
| 1 | 0.0 | 0.0 | 0.0 | 0.0 |
| 3 | 0.0 | 0.0 | 0.0 | 0.0 |
| 7 | 0.0 | 0.0 | 0.0 | 0.0 |
| 11 | 0.0 | 0.0 | 0.0 | 0.0 |
| 14 | 0.0 | 0.2 | 0.6 | 0.0 |
| 21 | 0.0 | 0.7 | 1.1 | 0.5 |
| 37 | 0.0 | 1.2 | ¹2.1 | 1.1 |
| 51 | 0.0 | ¹2.2 | 3.6 | ¹2.1 |
| 65 | 0.0 | 3.4 | ²3.7 | 3.3 |
| 79 | 0.0 | 3.3 | ²3.7 | 3.1 |
| 93 | 0.0 | 3.1 | ²3.5 | 2.7 |

¹ 2nd injection of original vaccine.
² Figures based on a 1:1000 antiserum dilution.

Neutralizing antibody was first discovered in a 1:100 dilution of antiserum in the animals in Groups II, III, and IV, 14 days following the initial vaccination. The titers continued to rise, and when the neutralization index of 1.0 was reached, the second injection of the same vaccine was administered. Groups II and IV received the second inoculation on the 51st day and Group III on the 37th day following the initial injection. The maximum neutralizing titers in Group II were achieved on the 14th day following the second injection or on the 65th day after the initial injection. Maximum neutralizing activity of sera from Group III was seen on the 28th day following the second injection. Antibody activity to IBR-SIU was still present in the sera from Groups II, III, and IV 93 days following the first injection.

Figure 7:
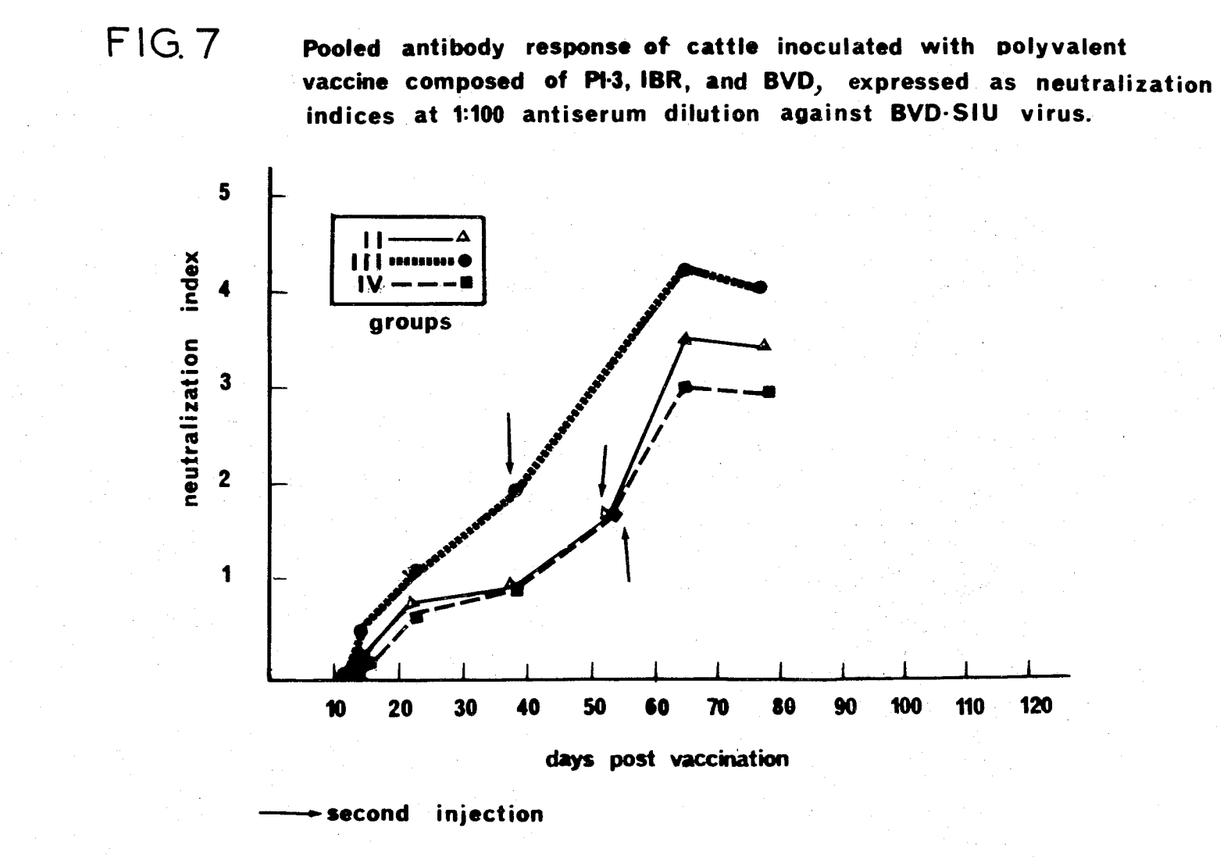
FIG. 7 is a graph showing the pooled antibody response of cattle to bovine viral diarrhea virus when inoculated with a polyvalent vaccine of the present invention.

Table IX and FIG. 7 show the neutralizing activity of antisera of animals in Groups II, III, and IV against BVD-SIU.

TABLE IX.—AVERAGE ANTIBODY RESPONSE OF CATTLE INOCULATED WITH POLYVALENT VACCINE COMPOSED OF PI-3, IBR, AND BVD VIRUSES EXPRESSED AS NEUTRALIZATION INDICES AT A 1:100 ANTISERUM DILUTION AGAINST IRB-SIU

| Day post-vaccination | Groups | | | |
|---|---|---|---|---|
| | I | II | III | IV |
| 1 | 0.0 | 0.0 | 0.0 | 0.0 |
| 3 | 0.0 | 0.0 | 0.0 | 0.0 |
| 7 | 0.0 | 0.0 | 0.0 | 0.0 |
| 11 | 0.0 | 0.0 | 0.0 | 0.0 |
| 14 | 0.0 | 0.2 | 0.7 | 0.1 |
| 21 | 0.0 | 0.6 | 1.0 | 0.5 |
| 37 | 0.0 | 0.8 | ¹7.8 | 0.8 |
| 51 | 0.0 | ¹1.7 | 3.1 | ¹1.7 |
| 65 | 0.0 | 3.6 | ²3.3 | 3.0 |
| 79 | 0.0 | 3.4 | ²3.0 | 2.8 |
| 93 | 0.0 | 3.1 | ²2.8 | 2.4 |

¹ 2nd injection of original vaccine.
² Figures based on a 1:1000 antiserum dilution.

As with IBR-SIU, neutralizing antibody was first detected on the 14th day after the initial injection. In Groups II and IV, the maximum titers were observed on the 14th day following the second injection. Maximum neutralization activity in Group III was seen on the 28th day after the second inoculation. Antibody to IBR-SIU persisted in the sera 93 days after the initial injection.

Figure 8:
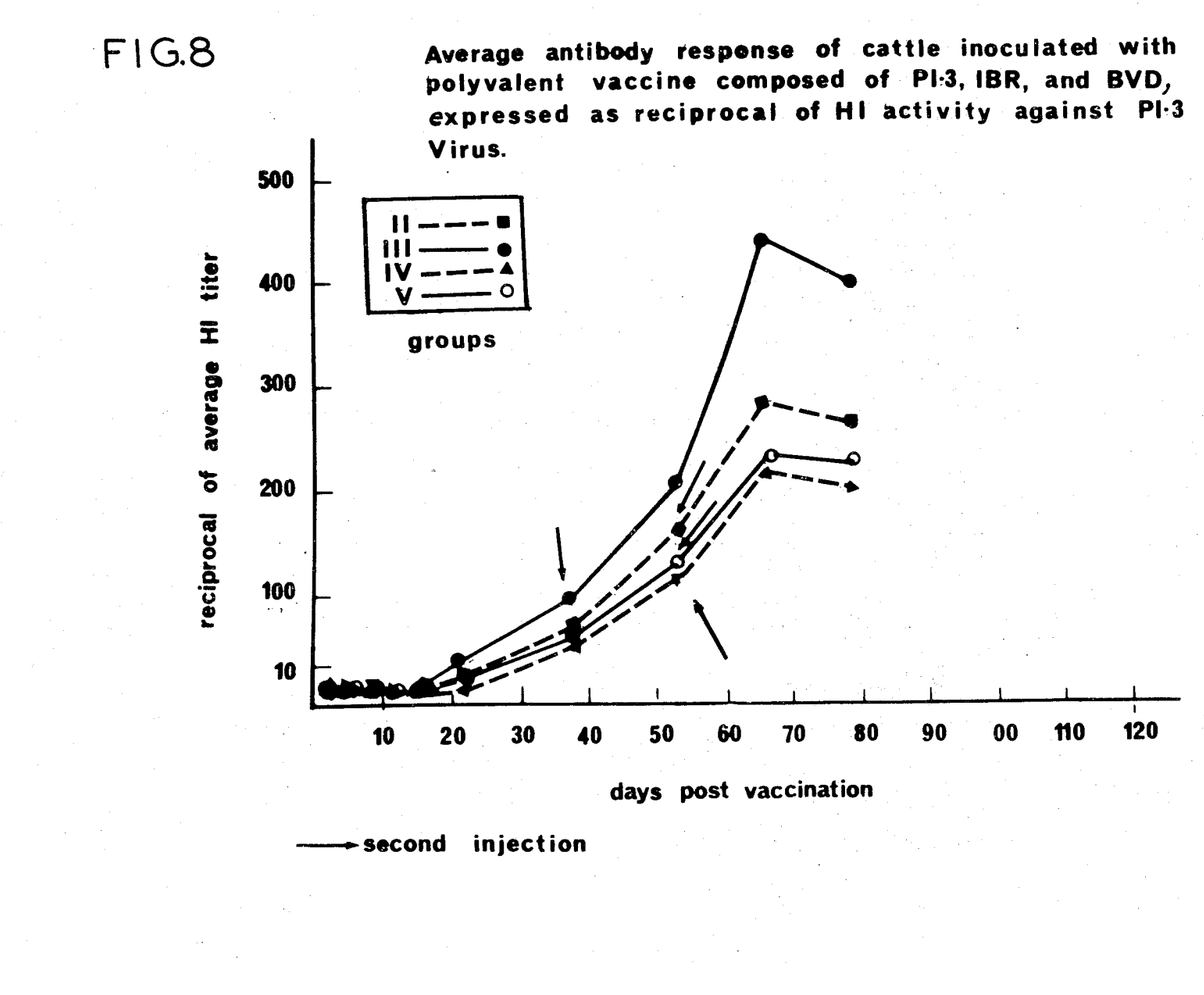
FIG. 8 is a graph showing the average antibody response of cattle to parainfluenza-3 virus when inoculated with a polyvalent vaccine of the present invention.

The hemagglutination-inhibiting activity of the sera against PI-3 virus is seen in Table X and FIG. 8.

TABLE X.—AVERAGE ANTIBODY RESPONSE OF CATTLE INOCULATED WITH POLYVALENT VACCINE COMPOSED OF PI-3, IBR, AND BVD VIRUSES EXPRESSED AS RECIPROCAL OF HI ACTIVITY AGAINST PI-3 VIRUSES

| Day Post-vaccination | Groups | | | | |
|---|---|---|---|---|---|
| | I | II | III | IV | V |
| 1 | 10 | 10 | 10 | 10 | 10 |
| 3 | 10 | 10 | 10 | 10 | 10 |
| 7 | 10 | 10 | 10 | 10 | 10 |
| 11 | 10 | 10 | 10 | 10 | 10 |
| 14 | 10 | 10 | 11 | 10 | 10 |
| 21 | 10 | 20 | 30 | 10 | 20 |
| 37 | 10 | 62 | ¹96 | 48 | 56 |
| 51 | 10 | ¹150 | 214 | ¹108 | 118 |
| 65 | 10 | 280 | 420 | 220 | 240 |
| 79 | 10 | 260 | 400 | 215 | 236 |
| 93 | 10 | 240 | 360 | 180 | 180 |

¹ 2nd injection of original vaccine.

All titers of 10≤10. The indicated HI titers are based on a rise above a base line of 10.

Parainfluenza-3-SIU is the only virus common to all vaccines of Groups II–V. Sera from Groups II, IV, and V showed maximum HI titers on the 14th day following the second inoculation. The maximum HI titer in Group III was on the 28th day after the second inocculation. Hemagglutination-inhibition titers persisted in the sera after the 93rd post-vaccination day.

Figure 9:
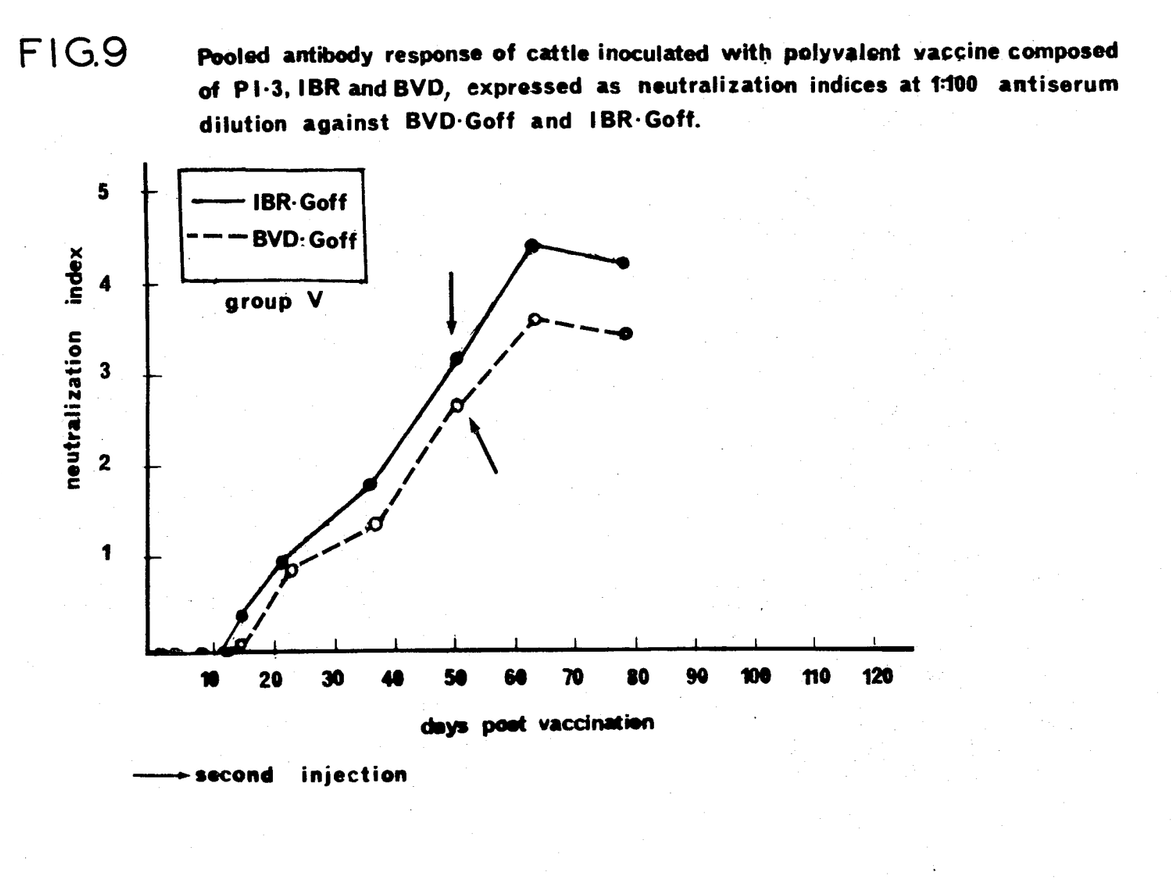
FIG. 9 is a graph showing the pooled antibody response of cattle to parainfluenza-3 virus when inoculated with a polyvalent vaccine of the present invention expressed on a different basis than in FIG. 8.

Table X and FIG. 9 show the neutralizing activity of antisera against IBR-Goff virus.

TABLE XI.—AVERAGE ANTIBODY RESPONSE OF CATTLE INOCULATED WITH POLYVALENT VACCINE COMPOSED OF PI-3, IBR-GOFF, ANB BVD-GOFF VIRUSES EXPRESSED AS NEUTRALIZATION INDICES AT A 1:100 ANTISERUM DILUTION AGAINST IBR-GOFF

| Day post-vaccination | Groups | |
|---|---|---|
| | I | V |
| 1 | 0.0 | 0.0 |
| 3 | 0.0 | 0.0 |
| 7 | 0.0 | 0.0 |
| 11 | 0.0 | 0.0 |
| 14 | 0.0 | 0.4 |
| 21 | 0.0 | 1.0 |
| 37 | 0.0 | 1.8 |
| 51 | 0.0 | ¹3.1 |
| 65 | 0.0 | 4.3 |
| 79 | 0.0 | 4.1 |
| 93 | 0.0 | 3.7 |

¹ 2nd injection of original vaccine.

Maximum neutralizing activity was achieved on the 14th day following the second injection. Titers were first detected on the 14th day following the initial injection. Neutralizing activity was still present on the 93rd day following the initial injection.

The mean neutralizing activity of sera to BVD-Goff is shown in Table XII and FIG. 9.

TABLE XII.—AVERAGE ANTIBODY RESPONSE OF CATTLE INOCULATED WITH POLYVALENT VACCINE COMPOSED OF PI-3, IBR-GOFF, AND BVD-GOFF VIRUSES EXPRESSED AS NEUTRALIZATION INDICES AT A 1:100 ANTISERUM DILUTION AGAINST BVD-GOFF

| Day post-vaccination | Groups | |
|---|---|---|
| | I | V |
| 1 | 0.0 | 0.0 |
| 3 | 0.0 | 0.0 |
| 7 | 0.0 | 0.0 |
| 11 | 0.0 | 0.0 |
| 14 | 0.0 | 0.1 |
| 21 | 0.0 | 0.9 |
| 37 | 0.0 | 1.3 |
| 51 | 0.0 | ¹2.4 |
| 65 | 0.0 | 3.5 |
| 79 | 0.0 | 3.1 |
| 93 | 0.0 | 2.8 |

¹ 2nd injection of original vaccine.

Neutralizing antibody was first detected on the 14th day following the initial injection. Maximum titers were achieved on the 65th day after the first injection or on the 14th day following the second injection. The presence of antibody was still detected on the 93rd day after the first vaccination.

The agglutinating activity of the antisera of Group IV against *Pasteurella multocida* is shown in Table XIII.

TABLE XIII.—AVERAGE ANTIBODY RESPONSE OF CATTLE INOCULATED WITH POLYVALENT VACCINE COMPOSED OF PI-3, IBR, BVD, AND *PAST. MULTOCIDA* EXPRESSED AS RECIPROCAL OF AGGLUTINATING ACTIVITY AGAINST *PAST. MULTOCIDA*

| Day post-vaccination | Groups | |
| --- | --- | --- |
| | I | V |
| 1 | 10 | 10 |
| 3 | 10 | 10 |
| 7 | 10 | 10 |
| 11 | 10 | 10 |
| 14 | 10 | 10 |
| 21 | 10 | 10 |
| 37 | 10 | 10 |
| 51 | 10 | [1] 10 |
| 65 | 10 | 10 |
| 79 | 10 | 10 |
| 93 | 10 | 10 |

[1] 2nd injection of original vaccine.

All titers of $10 \leq 10$. The indicated agglutinatint titers are based on a rise above a base line of 10.

No agglutinating titers were detected in the sera of animals injected with Vaccine II. The inability of animals to develop detectable antibody toward *Past. multocida* is unexplainable. Even after a second injection of antigen, agglutinating titers were not achieved.

The results of these two studies show that high titers of antibodies to BVD, IBR, and PI-3 viruses were detected in animals inoculated with the killed polyvalent vaccine of the invention and that these titers were considerably higher when the polyvalent vaccine was mixed with the alginate adjuvant. In addition, the titers of antibodies to each virus obtained after injection of the polyvalent vaccines were of the same order of magnitude as those produced by inocculation of single virus preparation.

In view of the above, it will be seen that the several objects of the invention are achieved and other advantageous results attained.

As various changes could be made in the above methods and products without departing from the scope of the invention, it is intended that all matter contained in the above description or shown in the accompanyying drawings shall be interpreted as illustrative and not in a limiting sense.

What is claimed is:

1. A polyvalent vaccine comprising a suspension, in a soluble alginate adjuvant vehicle suitable for parenteral injection, of killed infectious bovine rhinotracheitis virus, bovine viral diarrhea virus and parainfluenza-3 virus.

2. A polyvalent vaccine as set forth in claim 1 wherein said vehicle is constituted by an aqueous solution of formaldehyde.

3. A polyvalent vaccine as set forth in claim 2 wherein said three killed viruses are present in substantially equal proportions.

4. A polyvalent vaccine as set forth in claim 3 wherein the concentration of the aqueous solution of formaldehyde is about 0.4% by volume formalin.

5. A polyvalent vaccine as set forth in claim 1 further comprising as an adjuvant an equal volume of an aqueous solution containing about one to five percent weight/volume of a soluble alginate having the following characteristics:
   (a) in 5% weight/volume aqueous solution, readily passes a 24-gauge needle;
   (b) in 4% weight/volume aqueous solution, has a viscosity less than 50 centistokes;
   (c) a chemical equivalence below 250;
   (d) a milliosmolarity less than 150 kg. of water on a Fiske osmometer.

6. A polyvalent vaccine as set forth in claim 5 wherein the soluble alginate is sodium alginate and the alginate solution contains alginate insolubilizing ions in the form of a physiologically acceptable metallic gluconate.

7. A polyvalent vaccine as set forth in claim 6 wherein the alginate insolubilizing ions are calcium ions.

8. A polyvalent vaccine as set forth in claim 7 wherein the alginate solution contains approximately 0.67% by weight calcium gluconate.

9. A polyvalent vaccine as set forth in claim 1 wherein the total concentration of each of said killed viruses is between about $10^5$ and about $10^8$ organisms per ml.

10. The method of preparing a polyvalent vaccine comprising the steps of separately propagating viruses of infectious bovine rhinotracheitis, bovine viral diarrhea and parainfluenza-3, suspending the respective viruses in separate aqueous solutions containing a final concentration of about 0.4% by volume formalin to kill the viruses, maintaining each suspension at a temperature of about 4° C. for approximately one week, and combining a soluble alginate with portions of each suspension to produce a soluble alginate adjuvanted polyvalent vaccine containing said three viruses in killed form.

11. The method of preparing a polyvalent vaccine as set forth in claim 10 wherein equal portions of said suspension are combined to produce a polyvalent vaccine wherein theh killed viruses are present in substantially equal proportions.

12. The method of preparing a polyvalent vaccine as set forth in claim 11 wherein said portions of each suspension are combined with an equal volume of an aqueous solution containing about one to five percent weight/volume of a soluble alginate having the following characteristics:
   (a) in 5% weight/volume aqueous solution, readily passes a 24-gauge needle;
   (b) in 4% weight/volume aqueous solution, has a viscosity less than 50 centistokes;
   (c) a chemical equivalence below 250;
   (d) a milliosmolarity less than 150 per kg. of water on a Fiske osmometer.

13. The method of preparing a polyvalent vaccine as set forth in claim 12 wherein the soluble alginate is sodium alginate and the alginate solution contains alginate insolubilizing ions in the form of a physiologically acceptable metallic gluconate.

14. The method of preparing a polyvalent vaccine as set forth in claim 13 wherein the alginate solution contains aproximately 0.67% by weight calcium gluconate.

15. The method of treating bovine infections comprising the parenteral administration to a bovine of a soluble alginate-adjuvanted polyvalent vaccine comprising a suspension, in a soluble alginate adjuvant vehicle suitable for parenteral injection, of killed infectious bovine rhinotracheitis virus, bovine viral diarrhea virus and parainfluenza-3 virus.

16. The method of claim 15 wherein said three killed viruses are present in the suspension in substantially equal proportions.

17. The method of claim 16 wherein the vehicle is an aqueous solution containing from 0.4% by volume Formalin.

18. The method of claim 15 wherein said vaccine further comprises as an adjuvant an equal volume of an aqueous solution containing about one to five percent weight/volume of a soluble alginate having the following characteristics:
(a) in 5% weight/volume aqueous solution, readily passes a 24-gauge needle;
(b) in 4% weight/volume aqueous solution, has a viscositiy less than 50 centistokes;
(c) a chemical equivalence below 250;
(d) a milliosmolarity less than 150 per kg. of water on a Fiske osmometer.

References Cited
UNITED STATES PATENTS

| | | | |
|---|---|---|---|
| 3,075,883 | 1/1963 | Scherr et al. | 424—88 |
| 3,501,770 | 3/1970 | Gale et al. | 424—89 |
| 3,526,696 | 9/1970 | Gale et al. | 424—89 |

SHEP K. ROSE, Primary Examiner

U.S. Cl. X.R.

195—1.4; 424—88